United States Patent [19]
Toshida

[11] Patent Number: 4,816,376
[45] Date of Patent: Mar. 28, 1989

[54] METHOD FOR FORMING OPTICAL PATTERN IN POROUS GLASS

[75] Inventor: Yomishi Toshida, Yokohama, Japan

[73] Assignee: Canon Kabushiki Kaisha, Tokyo, Japan

[21] Appl. No.: 193,159

[22] Filed: May 6, 1988

Related U.S. Application Data

[63] Continuation of Ser. No. 846,890, Apr. 1, 1986, abandoned.

[30] Foreign Application Priority Data

Apr. 4, 1985 [JP] Japan .............................. 60-71689
Apr. 4, 1985 [JP] Japan .............................. 60-71690

[51] Int. Cl.$^4$ ............................................ G03C 5/00
[52] U.S. Cl. .................................... 430/290; 430/272; 430/325; 430/330
[58] Field of Search ................ 430/272, 290, 330, 325

[56] References Cited

U.S. PATENT DOCUMENTS 4,173,475 11/1979 Chandross et al. ................ 430/290
4,187,111 2/1980 Chandross et al. ................ 430/290
4,488,864 12/1984 Borrelli et al. .................... 430/290

Primary Examiner—Jack P. Brammer
Attorney, Agent, or Firm—Fitzpatrick, Cella, Harper & Scinto

[57] ABSTRACT

A method for forming an optical pattern involves subjecting a porous glass material impregnated with a photocurable composition to a patterning exposure. The composition remaining uncured in the unexposed portion of the glass material is removed from the glass material to form a pattern composed of a section containing a photocured composition filled in the pores of the glass material. The glass material is directly heated to carbonize the photocured composition present in the glass material, or heated after having been further impregnated with a substance capable of changing an optical characteristic of glass. The photocurable composition may comprise one or more members selected from an acrylic ester, a methacrylic ester, an acrylic ester resin and an epoxy resin, and optionally a photopolymerization initiator.

13 Claims, 4 Drawing Sheets

METHOD FOR FORMING OPTICAL PATTERN IN POROUS GLASS

This application is a continuation of application Ser. No. 846,890 filed Apr. 1, 1986, now abandoned.

FIELD OF THE INVENTION AND RELATED ART

The present invention relates to a method for forming an optical pattern, for example, one composed of a variation in optical density or refractive index, in a glass material or article.

Methods for forming an optical pattern, for example, formed by a variation in optical density, in a glass material by treatment of a glass material have attracted attention as a method useful for forming optical elements having various functions.

One of such methods is described in U.S. Pat. No. 4,403,031, as a method for providing an optical pattern in glass.

The method of this patent comprises the steps of:

(1) impregnating a porous glass article with a photolyzable organometallic compound;

(2) exposing the glass article to a patterning source of photolyzing light to photolytically convert at least some of the organometallic compound in exposed areas of the glass to photolyzed intermediates which are stable against migration in the glass;

(3) removing the organometallic compound remaining unphotolyzed in pores of the glass article from the latter through heating; and (4) heating the glass article to a sufficient temperature to cure the pores of the glass article to fix the pattern.

In such a method for forming an optical pattern in a porous glass material, in some cases, the portion other than an optical pattern must be shielded against light in order to enhance the function of the optical pattern. In the prior art, for this purpose, a light shield has been formed, e.g., by diffusing a satisfactorily light-shielding substance in the portion other than the optical pattern after the formation of the optical pattern in the above method.

With the optical patterns provided in the above conventional method, however, it is difficult to increase the color density of the light shield and, because even the optical pattern portion formed therein has a porosity, the light shielding substance may often penetrate into that portion, resulting in an indistinct contour of the optical pattern. For this reason, it has been difficult to form an optical pattern having good accuracy by the conventional method for forming an optical pattern.

SUMMARY OF THE INVENTION

It is an object of the present invention to provide a method which uses a porous glass material to enable the formation of an optical pattern having good accuracy.

Further, it is another object of the present invention to provide a method for rendering permanent a functional property applied to a glass without a high temperature treatment.

According to the present invention, the above objects are accomplished by providing a method for forming an optical pattern, which comprises the steps of: (a) subjecting to a patterning exposure a porous glass material impregnated with a photocurable composition, and (b) removing the composition remaining uncured in the unexposed areas of the glass material which has been subjected to the patterning exposure, thereby forming, in the glass material, a pattern constituted of the portion containing the photocured composition filled in the pores of the glass material.

These and other objects, features and advantages of the present invention will become more apparent upon a consideration of the following description of the preferred embodiments of the present invention taken in conjunction with the accompanying drawings.

DETAILED DESCRIPTION OF THE INVENTION

Figure 1A:
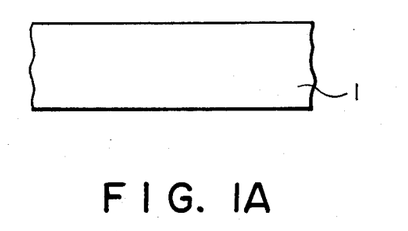
FIGS. 1A to 1G are schematic views in partial section of a glass material treated for illustrating basic steps in the method for forming optical pattern according to the present invention.
Figure 1B:
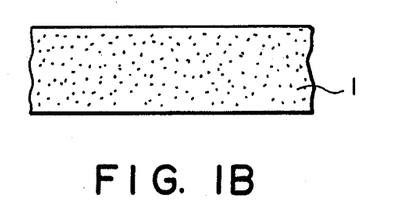

In the method according to the present invention, first, a photocurable composition is impregnated into a porous glass material 1 shown in FIG. 1 and preferably fully dried (see FIG. 1B).

The porous glass materials which may be used in the method according to the present invention include those having a quality, a pore size and the porosity depending on desired applications of an optical pattern formed by the method of the present invention, and among others, porous glass materials are preferred into which various substances may fast permeate and which may be uniformly impregnated, and which can retain the impregnating substances in the pores thereof and further can stably hold substances capable of changing optical characteristics of glass, e.g., optical density or the like. Such porous glass materials include high silica glasses which can be formed by a so-called phase-separation and an acid elution as disclosed in U.S. Pat. No.

4,403,031, and among others, for example, a porous Vycor (trade name, available from Corning Glass Works, Co., Ltd.) is preferred.

The porous glass material used in the method of the present invention may be of various shapes varying depending on desired applications of a glass article having an optical pattern formed therein by the method of the present invention, such as a plate, a disk, polygonal pillars, a column, and the like.

The photocurable composition which can be used in the method of the present invention may be one which has heretofore been used as a photoresist such as polyvinyl cinnamate, phenoxycinnamic acid ester resins, and novolk cinnamic acid ester resins, but particularly, a photocurable composition is preferred which comprises one or more selected from the group consisting of acrylic esters, methacrylic esters and derivatives of these, acrylic ester resins and epoxy resins, and if required, a photopolymerization initiator.

The acrylic and methacrylic esters which may be contained in the photocurable composition for use in the method of the present invention include monofunctional monomers having one ethylenic unsaturation such as n-alkyl acrylates and methacrylates containing alkyls of e.g., 1–10 carbon atoms such as methyl, ethyl or butyl group, for example, cyclohexyl acrylate, cyclohexyl methacrylate, dicyclopentyl acrylate, dicyclopentyl methacrylate, iso-bornyl acrylate, isobornyl methacrylate, phenyl acrylate, phenyl methacrylate, and halogen-substituted phenyl acrylates and methacrylates, and the derivatives of these compounds; and polyfunctional cross-linkable monomers having, e.g., 2 to 8 ethylenic unsaturations, such as diethylene glycol diacrylate and dimethacrylate, 1,6-hexanediol diacrylate, neopentyl glycol diacrylate, 2,2-bis-(4-acryloxyethoxyphenyl) propane and the halogene-substituted products thereof, trimethylolpropane triacrylate and trimethacrylate, pentaerythritol tetraacrylate, dipentaerythritol hexaacrylate, and derivatives of these.

Examples of the epoxy resins include: (1) bisphenol A- or F-type epoxy resins obtained by condensation of bisphenol A, or bisphenol F, the halide of these and epichlorohydrin including, as specific examples, Epikote 828, 834, 836, 1001, 1004, 1007 (Shell Chemical Co., trade name), DER 331, 332, 661, 664, 667 (Dow Chemical Co., trade name), Araldite 260, 280, 6071, 6084, 6097 (Ciba-Geigy Corp., trade name); (2) phenol novolak-type epoxy resins obtained by phenol novolak and epichlorohydrin includng, as specific examples, Epikote 152, 154 (Shell Chemical Co., trade name), Araldite EPN 1138, 1139, ECN 1235, 1273, 1280, 1299 (Ciba-Geigy Corp., trade name), DEN 431, 438 (Dow Chemical Co., trade name); and (3) alicyclic epoxy resins such as limonene diepoxide, 3,4-epoxy-6-methyl cyclohexylmethyl-3,4-epoxy-6-methylcyclohexane dicarboxylate, dicyclopentadiene diepoxide, vinylcyclohexene dioxide, dipentene dioxide, and epoxycyclohexene carboxylic acid-ethylene glycol-diether including, as specific commercial examples, Araldite CY 175, 177, 179, 184, 192 (Ciba-Geiy Corp., trade name), ERL 4221, 4299, 4234 (Union Carbide Corp., trade name). The epoxy resins may be used singly or in combination of two or more thereof.

Further, illustrative of the acrylic ester resins which may be incorporated in the photocurable composition for use in the method of the present invention are epoxy acrylates, urethane acrylates, and the like. Examples of the epoxy acrylates include those which may be obtained by esterifying an epoxy group in the above mentioned epoxy resins with (meth)acrylic acid. Examples of the urethane acrylates include those obtained by reacting (1) a compound having an isocyanate group such as tolylene diisocyanate with (2) an hydroxyl-containing compound including an acrylate having a hydroxyl group such as 2-hydroxyethyl acrylate and 2-hydroxyethyl methacrylate, and a polyether or polyester having a hydroxyl group at a terminal or in a side chain.

The above-mentioned epoxy resins and acrylic resins may preferably have a molecular weight in the range of 400 to 10000 and may preferably be used after having been adjusted to a viscosity in the range of 5 to $10^5$ centipoises.

The photocurable composition for use in the method of the present invention can be prepared by the addition of one or more selected from the group consisting of acrylic ester monomers, methacrylic ester monomers, acrylic ester resins, and epoxy resins, which have been illustrated hereinabove, and an optional photo-polymerization initiator which is usually used.

Such photo-polymerization initiators include, e.g., benzoin alkyl ethers, benzyl methyl ketal, acetophenone, the combination of benzophenone with amines, anthraquinone which can be used when the photocurable composition is prepared using an acrylic ester monomer and a methacrylic ester monomer and/or an acrylic ester resin as predominant components, and also include those having a cation polymerization initiating ability, such as allyl diazonium salts, allyl iodonium salts, allyl sulfonium salts, etc., which can be used when the photocurable composition is prepared from an epoxy resin, as a predominant component.

The photocurable composition used in the method of the present invention can impregnate the entire area of a porous glass material uniformly and rapidly at a satisfactory filling rate, and may preferably be prepared from components properly selected to meet the requirements to have characteristics such as a viscosity suitable for the composition to be stably retained in the pores in the porous glass and to have a good exposure sensitivity over the entire exposed area, particularly in the direction of exposing light penetration, i.e., in the thicknesswise direction perpendicular to the exposed surface of the glass material when the composition impregnating the porous glass is exposed. In addition, with the use of a solvent in a step of removing the uncured composition from the porous glass material, it is necessary for the portion, cured through the patterning exposure, of the photocurable composition used in the method of the present invention to have a resistance to the solvent for the removal of the uncured portion of the composition. To render the photocured composition resistant to a solvent as described above, the photocurable composition of the present invention may be preferably prepared using as a predominant component a polyfunctional cross-linkable monomer and/or an acrylic ester resin as illustrated hereinabove. When a monofunctional monomer as previously illustrated is employed as a component, the content thereof can be controlled to reduce the viscosity of the resulting photocurable composition so as to improve the impregnation into the porous glass material. However, if the amount of monofunctional monomer contained is too high, the photocured composition may be reduced in solvent resistance as described above and therefore, the amount should be moderated. Thus, the appropriate ratio of the monofunctional monomer to the polyfunctional monomer and/or the acrylic ester resin may generally be within the range of 80/20 to 0/100, while it depends on the viscosity of the respective components and the properties of the resultant cured products.

Referring to FIG. 1, for impregnating a porous glass material 1 uniformly and more rapidly over its entire area with the photocurable composition at a satisfactory filling rate, for example, a vacuum impregnation process is suitable which comprises placing the porous glass material into a vacuum vessel having a predetermined degree of vacuum, dropping a required amount of the photocurable composition onto the porous glass material and then leaving it to stand for a period of about 20 to 30 minutes.

In the method of the present invention, the photocurable composition is caused to uniformly impregnate the entire glass material in the impregnation step, even if the thickness of the glass material is of the order of 1 mm, because the composition has been prepared to have a characteristic of easy permeation into the pores in the porous glass material. Moreover, the photocurable composition is filled into the pores of several ten Å as well. Further, the photocurable composition is free of a solvent which should be evaporated for removal, and hence, any reduction in filling rate in the fine pores can not occur due to the releasing of solvent required when a photoresist is used as described above.

Figure 1C:
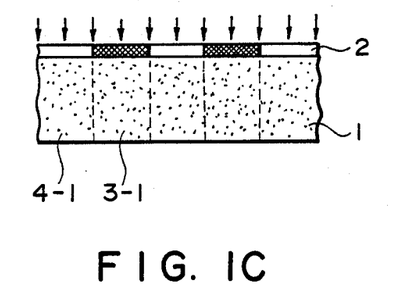

At the time when the impregnation of the photocurable composition has been completed in this manner, the composition deposited on the outer surface of the glass material 1 is wiped off and then, the glass material 1 is exposed through a mask 2 having a desired pattern, as shown in FIG. 1C.

In this patterning exposure, use is made of a light source for emitting a light capable of curing the photocurable composition impregnating the glass material 1. Illustrative of such light sources are a xenon lamp, a mercury lamp and the like.

Figure 1D:
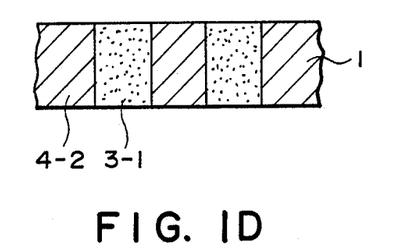

In the patterning exposure step, the composition impregnated in the exposed area 4-1 of the glass material is photocured (see FIG. 1D). In this case, the photosensitivity of the composition impregnating the glass material is good in the method of the present invention, and may not produce the absorption of light in the direction of light penetrated as in the photoresist, so that light can be irradiated in a sufficient amount over the entire exposed area, particularly even in the thickness-wise direction of the glass material perpendicular to the exposed surface to fully cure the composition present in the exposed section.

Figure 1E:
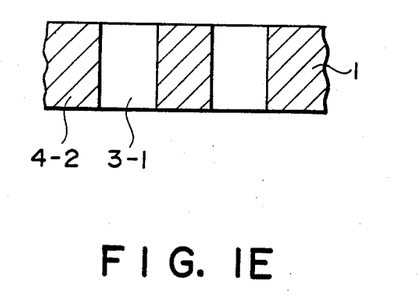

After the composition present in pores in the section 4-1 has been irradiated with light in this way, the uncured composition present in the unexposed section 3-1 as seen in FIG. 1E is removed from the glass material 1.

In removing the uncured composition from the glass material 1, a method can be suitably applied which comprises immersing the glass material after the patterning exposure in a solvent capable of dissolving the uncured composition for a predetermined period of time, preferably with convectional stirring of the solvent to elute it from the glass material for removal. The solvent used in such treatment may be any of those which are capable of dissolving the uncured composition and does not exert any influence of decomposition and dissolving on the uncured composition present in the porous glass material, but solvents having a relatively low boiling point are preferred so as to be easily removable from the glass material 1 in a simple operation such as drying. Representative of such solvents are hydrocarbons, halogenated hydrocarbons and ketones, specifically such as n-pentane, n-hexane, cyclohexane, benzene, toluene, xylene, dichloromethane, chloroform, carbon tetrachloride, methyl ethyl ketone, and acetone.

After the solvent elution of the uncured composition out of the glass material 1 has been completed, the solvent is removed out of the glass material by heating or drying in vacuum.

The removal of the uncured composition present in the unexposed section 3-1 from the porous glass material in this manner results in a formed pattern in the porous glass material 1 as shown in FIG. 1E, which pattern comprises the section 4-2 having the cured composition filled in the fine pores, that is, having the fine pores plugged.

Now, if the glass material 1 having the pattern formed therein as shown in FIG. 1E is heated at a predetermined temperature for a predetermined period of time to carbonize the cured composition filled in the fine pores, the section 4-2 containing the cured composition is colored into black to form, in the porous glass material, a black pattern in the light absorbed portion corresponding to the pattern of the exposing mask. This carbonization is carried out at a sufficient temperature for a sufficient period of time to carbonize the cured composition contained in the porous glass material, for example, in a nitrogen atmosphere at a temperature of about 400° C. for about one hour. It should be noted that the carbonization can also be conducted along with the drying treatment following the aforesaid elution removal of the uncured composition from the porous glass material.

The optical pattern formed by the method of the present invention in this manner has the photocured composition filled in the fine pores in the section, shown by reference numeral 4-2, of the glass material 1 at a satisfactorily high rate, and hence, it has a high pattern density and has a distinct pattern contour because the photocurable composition used in the method of the present invention has a good exposure sensitivity.

It should be understood that the method described hereinabove is applicable not only to the formation of an optical pattern, but also to a pore sealing or plugging treatment for a porous glass.

By fixing, in a porous glass, substances capable of imparting various functional characteristics to the glass, a funcational characteristic depending on the type of the substances can be simply imparted to the porous glass, and hence, such porous glasses have attracted attention as a glass material useful in glass articles having various functional characteristics.

In forming a glass article having a desired functional characteristic by fixing, in fine pores of a porous glass, a substance capable of imparting the desired functional characteristic to the glass, a pore plugging treatment is required for permanently confining within the glass the substance fixed in the pores to impart the functional characteristic to the glass so that the pores in the porous glass is plugged with the substance, for the purpose of rendering the functional characteristic imparted to the porous glass permanent, except in the case where some of the pores in the porous glass are allowed to remain in the glass article.

For such a pore plugging treatment for a porous glass, there is conventionally known a method for thermally treating a porous glass at a high temperature in an electric furnace to calcine it.

With the use of a substance having a poor heat resistance as one for imparting a functional characteristic to a porous glass, however, the following problem has been encountered. Upon the application of a pore plugging treatment for filling up the pores of the porous glass by the thermal treatment at a high temperature as in the prior art, the substance for imparting the functional characteristic to the glass fixed in the pores may lose the functional characteristic due to the heating treatment in some cases, resulting in an impossibility of forming a glass article having the functional characteristic imparted thereto.

Therefore, in the application of the pore plugging method for filling up the pores in the porous glass by the conventional thermal treatment at a high temperature in order to render permanent the functional characteristic imparted to the porous glass, a substance to be fixed in the pores in the porous glass to impart a functional characteristic to the glass is required to be stable to heat. Consequently, the selection of substances for imparting a functional characteristic to a porous glass has been extremely limited with the treatment by the conventional pore plugging method. In addition, with the use of a poor heat resistant substance for imparting a functional characteristic to a glass, it has been impossible in many cases to impart the functional characteristic to the glass, because the pore plugging method cannot be employed at a high temperature.

On the other hand, in the method of the present invention, it is possible to use the treatment for plugging the fine pores in the porous glass to impart a functional characteristic to the glass permanent, even with the use of a low heat-resistant substance, because no high temperature calcining treatment is involved.

The pore plugging treatment according to the present invention involves first impregnating a photocurable composition, in the above manner, into a porous glass material containing a substance fixed in its pores and capable of imparting a desired functional characteristic to the glass. With respect to the photocurable composition, the previously described photocurable composition is preferred, but other photocurable compositions may be used depending on the thickness of the porous glass material or the size of the pores.

After the impregnation of the photocurable composition, the glass material is exposed to a light capable of photocuring the photocurable composition impregnating the interior of the glass material.

In this exposure, a light source such as a xenon lamp, or mercury lamp can be employed.

The above exposure causes the photocurable composition impregnating the glass material to be photocured, thereby plugging the pores with the composition filled therein, so that the substance capable of imparting the desired functional characteristic to the glass and fixed in the pores is stably retained in the glass material and isolated from the external surroundings.

It is to be noted that the photocurable composition used in the pore plugging treatment may preferably be prepared using as predominant components the previously described polyfunctional monomer and photocurable acrylic ester resin and/or photocurable epoxy resin, in view of a resistance to the external surroundings, a durability and the like of the photocured composition filled in the pores in the porous glass after the pore plugging treatment by the method of the present invention. In addition, with the use of the previously illustrated monofunctional monomer, the amount of such monomer incorporated can be controlled to reduce the viscosity of the resulting photocurable composition so as to improve the impregnation therewith of the porous glass material, but if the amount of monofunctional monomer contained is too high, the resistance to the external surroundings, durability and the like of the photocured composition may be reduced in some cases, and hence, the amount should be controlled adequately.

The photocurable composition need not necessarily impregnate the entire glass material, but it may partially impregnate the glass material if a desired pore plugging effect is provided. For example, in the case where the substance previously fixed in the glass material may absorb the exposing light in the exposure treatment, the exposing light will not fully reach the central portion of the glass material in some cases. Therefore, the photocurable composition may impregnate at least only the intended surface layer of the glass material and be photocured, and in doing so, the pores in the glass material become isolated from the external surroundings, thus making it possible to provide a desired pore plugging effect.

For partially impregnating the porous glass material with the photocurable composition, any applying process such as a brushing, spraying or the like, and a screen printing process may be used. It should be noted that in impregnating the surface layer of the glass material with the photocurable composition as described above, the controlling of the viscosity of the composition to too low a level to enhance the impregnation results in a problem that the composition may impregnate not only the surface layer but also the interior of the glass material and consequently, the exposing light does not reach the interior of the glass material during exposure as discussed above, and in such a case, there can occur difficulty that the composition impregnating the interior of the glass material may remain not cured fully therein to hinder the functional characteristic intended to be imparted to the glass. Thus, it is necessary for the viscosity of the photocurable composition to be increased to some extent so that the composition may impregnate only the surface layer of the glass material.

In such a case, the viscosity of the photocurable composition varies depending on the size of the pores of the porous glass material and in the partial impregnation as described above, for example, by a screen printing process, the viscosity of the photocurable composition is preferably on the order of several tens to several hundreds of poises.

It is to be understood that in the method of the present invention, the above-described pore plugging treatment may be repeated two times or more until a desired pore plugging effect is provided. Further, the pore plugging treatment of the present invention may also be carried out through an appropriate combination of the steps of impregnating the photocurable composition into only the surface layer of the porous glass material and then exposing the resulting glass material, with the step of impregnating the entire glass material with the photocurable composition and then exposing the resulting glass material. An example of such a combination includes the case wherein the whole of the glass material is impregnated with the photocurable composition and then exposed, and further, only the surface layer of the aforesaid glass material is impregnated with the photocurable composition and then exposed.

While the example of forming one optical pattern has been previously illustrated using FIGS. 1A to 1E, an optical pattern can also be formed in the following manner without the formation of the black pattern by carbonization as described above.

Figure 1F:
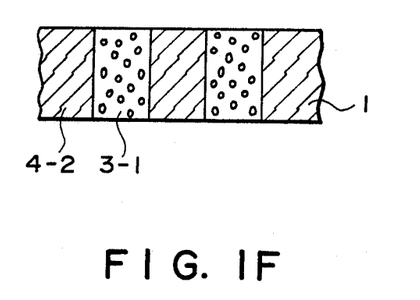

More specifically, a metal-containing compound capable of changing an optical characteristic of glass such as an optical density or the like is caused to impregnate a glass material 1 having a pattern formed therein as shown in FIG. 1E. In this case, the metallic compound permeates into and is retained in the pores depleted of the uncured composition which has been present in the section shown by the reference character 3-1 in FIG. 1F and has been removed therefrom, because the pores present in the section of the glass material 1 shown by the reference numeral 4-2 have been plugged with the cured composition.

Such metal-containing compounds capable of changing the optical characteristic of the glass, which is to impregnate the glass material 1 and may be used in this step, include those capable of imparting, for example, an optical density, that is, providing to the glass a difference in degree of absorbing light in the interior of the glass, e.g., a compound containing a metal atom such as Fe, Cu, Co, Cr, Mn, etc. For example, to form a green pattern in the glass material, cupric nitrate can be used, and similarly, it is possible to use ferric nitrate or iron pentacarbonyl for the formation of a brown pattern, cobalt nitrate or cobalt octacarbonyl for a blue pattern, chromium sulfate for a yellowish green pattern, and manganese dicarbonyl for a black pattern, respectively.

To impregnate the porous glass material with such a metallic compound, a compound such as iron pentacarbonyl, iron tricarbonyl (cyclobutadiene) or the like which itself may become a liquid or gas, may be used as such to impregnate the glass material, or a solid metallic compound may be dispersed or dissolved in a suitable solvent such as water or an organic solvent to prepare an impregnating solution and then used to impregnate the glass material. When an impregnating solution is to be prepared, a solvent for preparing an impregnating solution may be properly selected depending on the solubility of a metallic compound employed, but the use of an organic solvent rather than water is convenient because the organic solvent is more easy to remove than water is. It is believed that this is because of a strong affinity between water and silanol groups in the glass. Examples of such organic solvents which can be used for this purpose include the solvents which have been described hereinabove for the elution of the uncured composition.

A preferred method for impregnating such a metallic compound is to cause impregnation with the metallic compound under a vacuum condition capable of causing impregnation of a satisfactory amount of the metallic compound, and more particularly, to expose a porous glass material in a gaseous metallic compound in vacuum for a predetermined period of time, or to add a liquid metallic compound or a solution of metallic compound resulting from the dispersion or solubilization of the metallic compound in a suitable solvent, to a porous glass material placed under a vacuum and leave them to stand for a predetermined period of time.

After the metallic compound has impregnated the glass material in such a manner, the surface of the glass material 1 is cleaned with a suitable solvent, as desired, and then dried, preferably in vacuum.

Figure 1G:
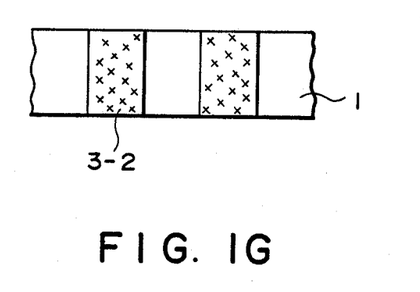

Then, the resulting glass material 1 is subjected to a heating treatment, for example, at a temperature of 700° C. for one hour to fix the metal contained in the metallic compound impregnating the glass material 1 and to remove the cured composition present and the organic moiety contained in the impregnating metallic compound in the glass material 1 form the glass material 1, thus making it possible to form, in the glass material 1, an optical pattern consisting of the section 3-2 containing the metal fixed in the pores as shown in FIG. 1G.

In this method for forming an optical pattern by impregnating a glass material with a compound containing a substance for changing an optical characteristic, it is preferred to employ the previously described compositions as a photocurable composition, but the composition is not intended to be limited to them. With the use of the previously described photocurable compositions, however, because they have a good exposure sensitivity, they can be patterned even within a porous glass material, and moreover, the photocured composition is filled in the pores in the section of the glass material shown by the reference character 4-2 at a satisfactorily high rate. In addition, the metallic compound does not permeate the patterned portion 4-2 consisting of the photocured composition during the impregnation of the glass material with the aforesaid metallic compound. Thus, there is obtained a distinct pattern having a high density.

Incidentally, if an impregnating metallic compound is photolyzable, the compound can be subjected first to an exposure with a light capable of photolyzing it to provide a photolyzed product, followed by a heating treatment as described above to satisfactorily fix the metal in the porous glass material.

In the method of the present invention described aove, a photocurable composition employed can uniformly and rapidly impregnate the entire porous glass material at a satisfactory rate, even though the porous glass material is relatively thick, and further, when the photocurable composition impregnating the porous glass material is exposed, it has a good exposure sensitivity in the entire exposed area, particularly in the direction of exposure light penetrated, i.e., in the direction of thickness of the glass material perpendicular to the exposed surface of the glass material. Therefore, according to the method of the present invention, it is possible to form a pattern constituted of the section having the photocured composition filled in the pores thereof with a good accuracy, and it is also possible to substantially improve the filling rate of photocured composition in the patterned portion. In addition, if the photocurable compound used in the method of the present invention is free of any solvent, the reduction cannot be encountered in rate of composition filled in the pores due to the releasing of solvent as in the case where the photoresist is used. Consequently, it is possible to form a distinct optical pattern of a high optical density in a porous glass material. Further, since the photocurable composition used in the method of the present invention has a good exposure sensitivity, the exposure time is reduced and thus, an optical pattern can be formed in a porous glass material in a shorter time.

With the application of the method of the present invention to the pore plugging treatment for a porous glass, it is unnecessary to employ a high temperature treatment and hence, a poorly heat-resistant substance can also be used effectively as a substance for imparting a function to the glass.

The present invention will now be described in detail by way of Examples.

EXAMPLE 1

A glass material of the following composition was subjected to a phase separating treatment and an elution treatment in a usual manner to fabricate a plate (10 mm×10 mm×1 mm) of porous glass.

| Glass Component Composition: | |
| --- | --- |
| $SiO_2$ | 58–62 wt. % |
| $B_2O_3$ | 27–32 wt. % |
| $Na_2O$ | 7–12 wt. % |
| $Al_2O_3$ | 0–3 wt. % |

The plate was dried at a temperature of 300° C. for 8 hours under a reduced pressure (0.1 Torr) and then cooled.

Then, the plate was disposed in a vacuum vessel which was then evacuated. When a level of 0.1 Torr was reached, 2 ml of a photocurable composition No. 1 comprising the following ingredient was poured onto the plate, and they were left to stand for 20 minutes, thereby allowing the composition No. 1 to impregnate the plate. After the completion of the impregnation, the pressure within the vacuum vessel was returned to an atmospheric level, and the plate was withdrawn. The composition on the surface of the plate was wiped off therefrom.

| Composition No. 1: | |
| --- | --- |
| Cyclohexyl acrylate | 70 wt. parts |
| 2,2-bis-(4-acryloxyethoxy-phenyl)propane | 30 wt. parts |
| Benzoin isopropyl ether | 1 wt. parts |

Then, an exposure mask having a through hole of 3 mm diameter made therein was overlaid on the surface of the plate, and the latter was then exposed through the exposure mask for 10 minutes by an ultraviolet light source of an ultra-high pressure mercury lamp (250 W), so that light was caused to penetrate in the direction of thickness of the plate to cure the photocurable formulation present in the portion of the plate irradiated with the ultraviolet rays.

After the completion of the exposure, the plate was immersed in 5 ml of dichloromethane for 20 minutes with stirring by a magnetic stirrer and then, after replacing this immersing dichloromethane by fresh one, the plate was immersed in this fresh dichloromethane for 20 minutes. Further, this operation was repeated once more to elute the uncured formulation present in the unexposed area of the plate for removal therefrom. Upon the vacuum drying of the plate treated in this manner, a columnar pale yellow pattern having a diameter of 3 mm and comprising the photocured composition No. 1 was formed in the plate at its area corresponding to the exposure mask, which pattern extended from the exposed surface to the opposite surface in the direction of thickness of the plate.

Finally, the plate having the pale yellow pattern formed therein was heated at 400° C. for one hour in a nitrogen atmosphere to carbonize the photocured composition No. 1 present in the plate, thus forming, in the plate at its area corresponding to the exposure mask, a columnar black pattern having a diameter and extending from the exposed surface to the opposite surface in the direction of thickness of the plate.

The formed black pattern exhibited a deep black color, had a distinct contour, and further corresponded to the pattern of the exposure mask with good accuracy.

EXAMPLE 2

A black pattern was formed in the same manner as in Example 1, except for the use of a photocurable composition No. 2 as follows:

| Composition No. 2: | |
| --- | --- |
| Cyclohexyl acrylate | 30 wt. parts |
| Neopentyl glycol diacrylate | 40 wt. parts |
| 2,2-bis-(4-acryloxyethoxy-phenyl)propane | 30 wt. parts |
| Benzoin isopropyl ether | 1 wt. parts |

The formed black pattern exhibited a deep black color, had a distinct contour, and further corresponded to the pattern of the exposure mask with good accuracy.

EXAMPLE 3

A black pattern was formed in the same manner as in Example 1, except for the use of a photocurable composition No. 3 as follows:

| Composition No. 3: | |
| --- | --- |
| Neopentyl glycol diacrylate | 70 wt. parts |
| Bisphenol type epoxy acrylate (a difunctional acrylate produced by addition of acrylic acid to Epikote 828 (trade name, available from Yuka Shell Epoxy, K.K.)) | 30 wt. parts |
| Benzoin isopropyl ether | 1 wt. parts |

The formed black pattern exhibited a deep black color, had a distinct contour, and further corresponded to the pattern of the exposure mask with good accuracy.

EXAMPLE 4

First, the composition No. 2 was used to impregnate a plate of porous glass similar to one made in Example 1 in the same manner as in Example 2, and was then subjected to a patterning exposure. The uncured composition was removed from the plate, and the resulting material was then dried in vacuum, thus forming a columnar pale yellow pattern having a diameter of 3 mm which comprised the section having the photocured formulation No. 2 filled in the pores and extended from the exposed surface to the opposite surface in the direction of thickness of the plate.

Then, the plate having the pale yellow pattern formed therein was placed into a vacuum vessel, and a liquid $Fe(CO)_5$ was poured into the vacuum vessel which was then evacuated to 0.1 Torr to generate the vapor of $Fe(CO)_5$. The plate was exposed to this vapor for 20 minutes to impregnate the plate with $Fe(CO)_5$. The exposure treatment caused $Fe(CO)_5$ to permeate the pores in the section other than the pale yellow pattern portion of the plate. This section was colored into yellow.

The pressure within the vacuum vessel was returned to an atmosphere level, and the plate was withdrawn from the vessel. Then, the plate was exposed for 5 minutes by a high pressure mercury lamp (250 W) to photolyze the Fe(CO)$_5$ having permeated the plate. Upon this exposure, the section of the plate impregnated with Fe(CO)$_5$ changed in color from yellow to light brown through photolysis of Fe(CO)$_5$.

Then, the resulting plate was heated at 700° C. in air for one hour to fix the iron atoms on the inner surfaces of the pores in the porous glass and to remove the photocured formulation No. 2 out of the plate, so that the pale yellow color of the section containing the photocured composition No. 2 filled therein, i.e., the columnar pattern having a diameter of 3 mm disappeared and this section became colorless and transparent. The section impregnated with the iron compound changed in color from light brown to brown. Thus, a 3 mm diameter columnar optical pattern extending from the exposed surface to the opposite surface in the direction of thickness of the plate and consisting of the brown section surrounding the colorless and transparent section was formed in the plate.

The formed brown pattern had a good pattern density and a distinct contour and corresponded to the pattern of the exposure mask with a good accuracy.

Figure 2:
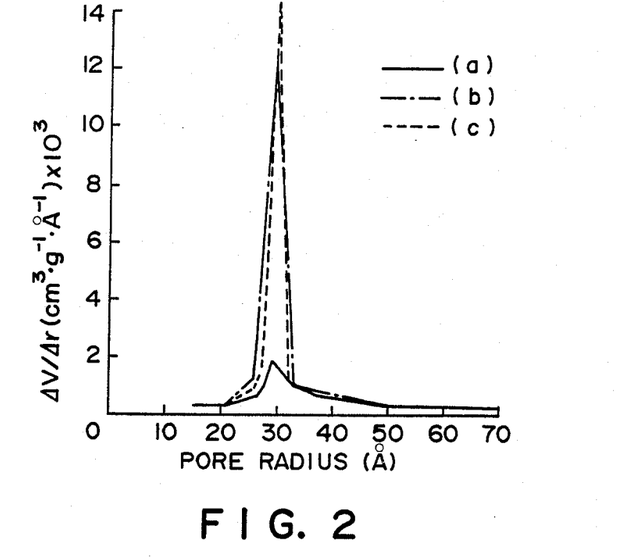
FIG. 2 is a graph illustrating distributions of pores in a plate-like material before and after treatment in Examples of the present invention, wherein the pattern indicated by (a) represents the distribution of pores filled with a photocurable substance in a composition No. 2, the pattern indicated by (b) represents the distribution of pores after the photocurable substance in the composition No. 2 has been removed from the plate material by the last heating treatment, and the pattern indicated by (c) represents the distribution of pores in the plate material before treatment by the method of the present invention.

In this Example, using an automatic surface area measuring device (available from Carlo Erba Strumentazione), the states of the pores in the columnar pattern formed section before and after the last heating treatment of the plate were measured, i.e., the state of the pores in this section containing the photocured composition No. 2 filled in the pores and the state of the pores in this section depleted of the photocured composition removed from the plate by the last heating treatment. The results are shown in FIG. 2. This figure illustrates the distributions in diameter of the pores, wherein the higher the peak at a radius is, the more the number of the pores having the radius is.

In FIG. 2, the pattern indicated by (a) represents the distribution of the pores in this section containing the photocured composition No. 2 filled in the pores, the pattern indicated by (b) represents the distribution of the pores in this section depleted of the photocured composition No. 2 removed from the plate by the last heating treatment, and the pattern indicated by (c) represents the distribution of the pores which the plate had had prior to the treatment by the method of the present invention.

As can be seen from FIG. 2, the pattern (a) provides a lower peak as a whole, with this section being filled with the photocured composition No. 2 at a high rate, and the peak near the 30 Å radius of the pore is very small, indicating that the pores are also fully filled with the photocured composition No. 2.

On the other hand, in the pattern (b), the peak near the 30 Å radius of the pore is larger and the configuration of this pattern substantially coincides with that of the pattern (c), indicating that the photocured composition No. 2 was fully removed from the plate after the heating treatment. It is noted that the specific surface area of the pores in this section in the state shown in the pattern (b) was 130 m$^2$/g and about 90% of the specific surface area of the pores in this section before the treatment, i.e., in the state shown in the pattern (c).

EXAMPLE 5

A columnar optical pattern of 3 mm in diameter formed by a blue section surrounding a colorless, transparent section was formed in the same manner as in Example 4, except that instead of the vapor of Fe(CO)$_5$ impregnating the plate, 2 ml of a solution of 5% by weight Co$_2$(CO)$_8$ in dichloromethane was poured onto the plate placed under a reduced pressure in a vacuum vessel, and they were left to stand for 20 minutes, thereby allowing Co$_2$(CO)$_8$ to impregnate the plate and thereafter, the pressure within the vacuum vessel was returned to an atmospheric level to withdraw the plate, and the metallic compound deposited on the surace of the plate was wiped off therefrom by using dichloromethane.

The formed blue pattern was shaped into a columnar configuration with a diameter of 3 mm and extending from the exposed surface to the opposite surface in the direction of thickness of the plate, and had a good pattern density and a distinct contour to correspond to the pattern of the exposing mask with a good accuracy.

COMPARATIVE EXAMPLE 1

A plate similar to one made in Example 1 was dried for 8 hours at 300° C. under a reduced pressure (0.1 Torr) and then cooled.

Then, the plate was placed at a prescribed position in a vacuum vessel which was then evacuated. When the pressure within the vacuum vessel reached a level of 0.1 Torr, 2 ml of a positive-type photoresist (AZ-1350, available from Shipley Far East Co.) was poured onto the plate, and they were left to stand for 20 minutes, thereby allowing the positive-type photoresist to impregnate the plate. After the completion of the impregnation, the pressure within the vacuum vessel was returned to an atmospheric level, and the resulting plate was withdrawn. The photoresist deposited on the surface of the plate was wiped off and the plate was then heated for drying at 90° C. for 30 minutes.

Subsequently, an exposure mask having a 3 mm diameter through hole made therein was overlaid on the surface of the plate, and then the plate was exposed in the same manner as in Example 1, except that the exposing time was changed to 60 minutes.

After the completion of the exposure, the plate was immersed in 50 ml of a developing solution for Az-1350 for 10 minutes with stirring by a magnetic stirrer, and then, after replacing this solution with fresh one, the plate was additionally immersed in this fresh developing solution for 10 minutes. This operation was repeated once more to remove the photoresist present in the exposed area of the plate and solubilized in the developing solution. The plate treated in this manner was washed with distilled water and then dried. Thus, formed in the plate at its place corresponding to the exposure mask was a 3 mm diameter columnar pattern extending from the exposed surface to the opposite surface in the thickness-wise direction of the plate and composed of a reddish brown section surrounding a transparent section and filled with the photoresist.

Then, the resulting plate was impregnated with Fe(CO)$_5$ in the same manner as in Example 4 and further subjected to a heating treatment.

In this Comparative Example, however, the whole of the plate was colored in brown, thus failing to provide an optical pattern as obtained in Example 4. This is attributable to the Fe(CO)$_5$ impregnated even the pores of the plate filled with the photoresist because the pores in the porous glass material were insufficiently filled with the photoresist.

COMPARATIVE EXAMPLE 2

An optical pattern was formed in the same manner as in Comparative Example 1, except that the patterning exposure was conducted for 10 minutes.

In the patterning exposure, however, the exposed area of the plate was merely exposed in a depth on the order of one third the thickness of the plate from the exposed surface in the thickness-wise direction, and a satisfactory patterning exposure effect was not provided. As a result, a columnar pattern surrounded by the photoresist-filled section was only formed in a depth of one third the thickness of the plate from the exposed surface in the thickness-wise direction.

COMPARATIVE EXAMPLE 3

The formation of an optical pattern was carried out in the same manner as in Comparative Example 1, except that the patterning exposure was conducted for 30 minutes.

In the patterning exposure, however, the exposed area of the plate was merely exposed to a depth on the order of one half the thickness of the plate from the exposed surface in the thickness-wise direction, and a satisfactory patterning exposure effect was not provided. As a result, a columnar pattern surrounded by the photoresist filled section was only formed in a depth of one half the thickness of the plate from the exposed surface in the thickness-wise direction.

COMPARATIVE EXAMPLE 4

The formation of an optical pattern was carried out in the same manner as in Comparative Example 1, except that the patterning exposure was conducted for 120 minutes.

However, the exposure time was too long in the patterning exposure, and hence a pattern formed surrounded by the photoresist filled section became dull in the exposed surface of the plate up to the unexposed portion, thus failing to form a satisfactory optical pattern.

COMPARATIVE EXAMPLE 5

The formation of an optical pattern was carried out in the same manner as in Comparative Example 1, except that the impregnation of a plate with a positive-type photoresist AZ-1350, available from Shipley Far East Co.) and the heating treatment thereof were repeated three times, and the patterning exposure was effected for 120 minutes.

In the patterning exposure, however, the exposed portion of the plate was merely exposed to a depth of no more than about one third the thickness of the plate from the exposed surface in the thickness-wise direction, and a satisfactory patterning exposure effect was not provided. For this reason, the columnar pattern formed surrounded by the photoresist filled section only covered to a depth of about one third the thickness of the plate from the exposed surface in the thickness-wise direction.

In this Comparative Example, the states of the pores in the plate before and after the impregnation of the photoresist therein were determined by using an automatic surface area measuring device (available from Carlo Erba Strumentazione). The results are shown in FIG. 3.

Figure 3:
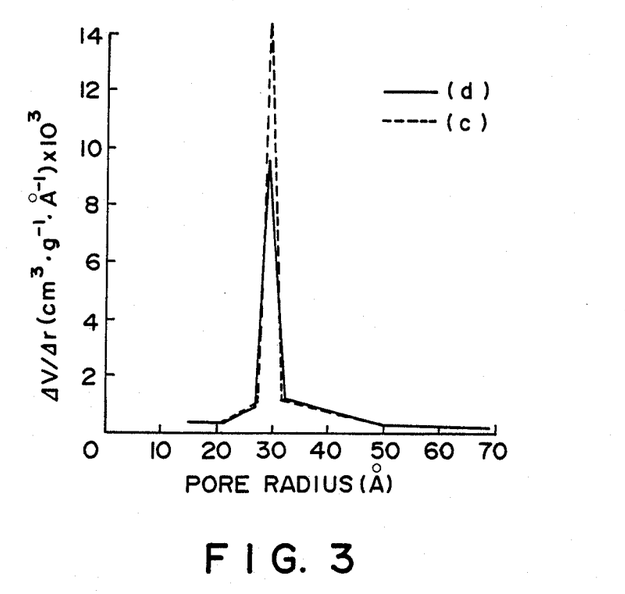
FIG. 3 is a graph illustrating distributions of pores in a plate-like material before and after treatment in the prior art method, wherein the pattern indicated by (c) represents the distribution of pores in the plate-like material before impregnation with a photoresist, and the pattern indicated by (d) represents the distribution of pores in the plate-like material after impregnation with the photoresist.

In FIG. 3, the pattern indicated by (c) represents the distribution of the pores the plate had before the impregnation of the photoresist, and the pattern indicated by (d) represents the distribution of the pores the plate had after the impregnation of the photoresist.

By comparison of the patterns (c) and (d) in FIG. 3, the following can be seen. There are peaks at a pore radius of 30 Å, and the proportion in height of the peaks indicates that even though the photoresist was caused to impregnate the plate, only about one third of the whole of the pores having a radius of 30 Å in the plate was filled with the photoresist.

EXAMPLE 6

By using the photocurable composition No. 2 and the plate described in Example 2, the plate of porous glass was impregnated with the composition No. 2 in the same manner as in Example 1.

Then, the resulting plate was exposed for 10 minutes by an ultraviolet source of an ultra-high pressure mercury lamp (250 W) with the light allowed to penetrate the plate in the thickness-wise direction, thereby curing the photocurable formulation present in that portion of the plate which had been irradiated with ultraviolet rays.

Figure 4:
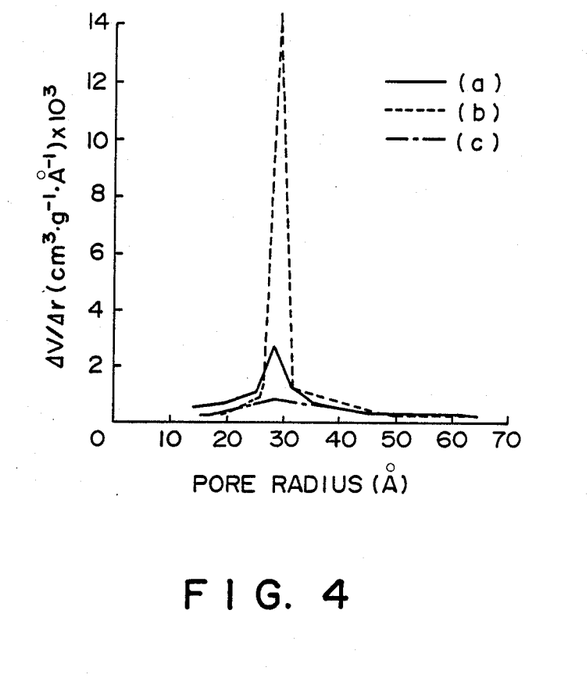
FIG. 4 is a graph illustrating distibutions of pores in a plate-like material before and after treatment in an Example of the present invention, wherein the pattern indicated by (a) represents the distribution of pores in the plate-like material after the photocurable substance in the composition No. 2 has been filled in the pores, the pattern indicated by (b) represents the distribution of pores in the plate-like material before the filling of the photocurable substance in the composition No. 2 in the pores, and the pattern indicated by (c) represents the distribution of pores in the plate material which has been treated in Example 9.

After the completion of the pore plugging treatment, the state of the pores in the plate after the pore plugging treatment in this Example was measured by using an automatic surface area measuring device (available from Carlo Erba Strumentazione) and compared with the state before the treatment. The results are shown in FIG. 4. This figure illustrates the distribution in radius of the fine pores, wherein the higher the peak at a radius is, the more the number of the pores having the radius is.

In FIG. 4, the pattern indicated by (a) represents the distribution of the pores in the plate containing the photocured composition No. 2 filled in the pores, and the pattern indicated by (b) represents the distribution of the pores in the plate before the treatment, i.e., before the filling of the photocured composition No. 2 in the pores.

As shown in FIG. 4, in the pattern (b), the peak near the 30 Å radius of the pores is higher, indicating that most of the pores the plate has are of 30 Å radius and not plugged. On the contrary, in the pattern (a), the whole thereof is in a lower position, indicating that the plate is filled with the photocured formulation No. 1 at a high rate, and also, the peak near to the 30 Å radius of the pores is very low, demonstrating that the fine pores are also filled sufficiently with the photocured formulation No. 1 and the fine pores are saisfactorily plugged.

EXAMPLE 7

The pore plugging treatment of the porous glass plate was carried out according to the method of the present invention in the same manner as in Example 6, except that use is made of the photocurable composition No. 1 shown in Example 1.

The state of the pores in the plate which had been subjected to the pore plugging treatment in this manner was determined as in Example 6.

The results showed that the distribution of the pores in the plate after the pore plugging treatment was substantially similar to the pattern indicated by (b) in FIG. 4, and the pores in the plate were sufficiently filled with the photocured product of the composition No. 1 and satisfactorily plugged by the pore plugging treatment in this Example.

EXAMPLE 8

The pore plugging treatment of the porous glass plate was carried out according to the method of the present invention in the same manner as in Example 6, except for the use of the photocurable composition No. 3 shown in Example 3.

The state of the pores in the plate which had been subjected to the pore plugging treatment in this manner was determined as in Example 6.

The results showed that the distribution of the pores in the plate after the pore plugging treatment was substantially similar to the pattern indicated by (b) in FIG. 4, and the pores in the plate were sufficiently filled with the photocured product of the composition No. 3 and satisfactorily plugged by the pore plugging treatment in this Example.

EXAMPLE 9

By using a screen printing process, onto the surface of the plate which had been subjected to the pore plugging treatment in Example 6 was applied, to a thickness of about 60 microns, a photocurable composition produced from the addition of 2 parts by weight of 1-hydroxyl hexylphenyl ketone (Trade name: Irgacure 184 from Nippon Ciba-Geigy) as a photopolymerization initiator to 100 parts by weight of diacrylic ester of tris-(2-hydroxylethyl)isocyanurate (viscosity: about 130 Poises). Then, the opposite surfaces of the resulting plate were exposed to an ultraviolet source of an ultra-high pressure mercury lamp (250 W) to photocure the photocurable composition newly applied on the surface of the plate, thus completing the pore plugging treatment.

The state of the pores in the surface of the plate which had been subjected to the pore plugging treatment in this manner was determined as in Example 6.

The distribution of the pores in the surface of the plate after the pore plugging treatment is shown as a pattern (c) in FIG. 4.

This pattern (c) also showed a lower peak as a whole indicating that the plate was filled with the photocured product at a high rate, and the peak near the 30 Å radius of the pores was lower than that of the pattern (a) in FIG. 4, representing that the fine pores were also filled sufficiently and further plugged satisfactorily with the photocured product.

What is claimed is:

1. A method for forming an optical pattern comprising:
   (a) impregnating at least the surface layer of pores of a porous glass material with a photocurable composition, said photocurable composition comprising a compound selected from the group consisting of acrylic esters, methacrylic esters, acrylic ester resins, epoxy resins and mixtures thereof;
   (b) subjecting said impregnated porous glass material to a patterning exposure to thereby cure said photocurable composition in the exposed portion of the glass material and leave uncured said photocurable composition in the unexposed portion of the glass material;
   (c) removing said uncured photocurable composition in the unexposed portion from the glass material while leaving said cured photocurable composition in the exposed portion;
   (d) impregnating said unexposed portion of the glass material with a metallic compound capable of changing the optical characteristic of the glass material, said metallic compound containing a metal atom selected from the group consisting of Fe, Cu, Co, Cr and Mn; and
   (e) heating said impregnated porous glass material for a period of time and at a temperature sufficient to fix said substance in the pores of said porous glass material and to remove said cured photocurable composition from the porous glass material.

2. A method according to claim 1, wherein said acrylic ester is a monofunctional monomer.

3. A method according to claim 2, wherein said monofunctional monomer is selected from the group consisting of n-alkyl acrylates, cyclohexyl acrylate, dicyclopentyl acrylate, isobornyl acrylate, phenyl acrylate, and halogen-substituted phenyl acrylates.

4. A method according to claim 1, wherein said methacrylic ester is a monofunctional monomer.

5. A method according to claim 4, wherein said monofunctional monomer is selected from the group consisting of n-alkyl methacrylates, cyclohexyl methacrylate, dicyclopentyl methacrylate, isobornyl methacrylate, phenyl methacrylate, and halogen-substituted phenyl methacrylates.

6. A method according to claim 1, wherein said acrylic ester is a polyfunctional cross-linkable monomer.

7. A method according to claim 6, wherein said polyfunctional cross-linkable monomer is selected from the group consisting of diethylene glycol diacrylate, 1,6-hexanediol diacrylate, neopentyl glycol diacrylate, 2,2-bis-(4-acryloxyethoxyphenyl)propane and halogen-substituted products thereof, and trimethylol propane triacrylate.

8. A method according to claim 1, wherein said methacrylic ester is a polyfunctional cross-linkable monomer.

9. A method according to claim 8, wherein said polyfunctional cross-linkable monomer is selected from the group consisting of diethylene glycol dimethacrylate, and trimethylolpropane trimethacrylate.

10. A method according to claim 1, wherein said acrylic ester resin is epoxy acrylate or urethane acrylate.

11. A method according to claim 1, wherein said optical characteristic is an optical density.

12. A method according to claim 1, wherein said photocurable composition further comprises a photopolymerization initiator.

13. A method according to claim 1, wherein said metallic compound is a carbonyl compound or a nitrate compound.

* * * * *